United States Patent
Connery et al.

(10) Patent No.: US 8,170,401 B2
(45) Date of Patent: May 1, 2012

(54) OPTIMIZING AD INSERTION BY REMOVING LOW INFORMATION FRAMES

(75) Inventors: Glenn William Connery, Petaluma, CA (US); Andrew Palfreyman, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 757 days.

(21) Appl. No.: 12/277,486

(22) Filed: Nov. 25, 2008

(65) Prior Publication Data

US 2010/0129056 A1    May 27, 2010

(51) Int. Cl.
*H04N 5/917* (2006.01)
(52) U.S. Cl. ........................ 386/328; 386/356
(58) Field of Classification Search .............. None
See application file for complete search history.

(56) References Cited

U.S. PATENT DOCUMENTS

| 6,380,991 | B1 | 4/2002 | Teichmer | |
|---|---|---|---|---|
| 6,546,050 | B2 * | 4/2003 | Ramaswamy | 375/240.03 |
| 2009/0097572 | A1 | 4/2009 | Connery et al. | |
| 2009/0217318 | A1 | 8/2009 | Versteeg et al. | |

* cited by examiner

*Primary Examiner* — Huy T Nguyen
(74) *Attorney, Agent, or Firm* — Edell, Shapiro & Finnan, LLC

(57) ABSTRACT

Techniques are provided to perform seamless or non-seamless ad insertion using a low-complexity process. Delay is introduced into a transport stream to prevent decoder buffer overflow. Delay buildup in the transport stream is reduced by removing pre-identified redundant or near redundant frames. Pre-identification of frames for removal reduces the processing required at the splice points, while maintaining a minimum overall delay in the transport stream.

18 Claims, 6 Drawing Sheets

OPTIMIZING AD INSERTION BY REMOVING LOW INFORMATION FRAMES

TECHNICAL FIELD

The invention relates to advertisement insertion into MPEG transport streams.

BACKGROUND

As is well-known in the art, MPEG (i.e., MPEG-1, MPEG-2, MPEG-4, H.264 (MPEG-4 AVC)) compressed video and audio streams are mapped by an encoder into MPEG-2 transport streams as elementary streams (ES) packed into packetized elementary stream (PES) packets, which, in turn, are packed in MPEG-2 transport stream (TS) packets. The PES packets contain a PES header which contains, among other things, a presentation time stamp (PTS) and, optionally, a decoding time stamp (DTS) (in case the DTS is not present, it is considered equal to the PTS). The DTS tells the decoder when to decode a video/audio frame, while the PTS tells the decoder when to display (i.e., present) the video/audio frame. Both the DTS and PTS values are actually time events that are relative to a time reference that is also transmitted in the MPEG-2 Transport Stream. This time reference is called the system time clock (STC) and is coded in the TS program clock reference (PCR) field as samples of a 27 MHz counter (clock).

All MPEG compression standards define a standard for the decoder. The decoder decodes at a constant bit rate, while the encoder encapsulates variable bit rate information. There is no standard for an encoder other than it must generate a decoder compliant bitstream. This allows various vendors to optimize their encoders in unique ways. The encoder uses a video buffering verifier (VBV) model to ensure the variable rate information can be decoded properly (when buffer level feedback is not available from the decoder). The VBV model is designed to mimic the operation of a decoder and is well known in the art.

MPEG compression standards also define a standard for the STCs used to generate the PCRs. The STC must clock at 27 MHz±810 Hz and drift no more than one cycle every 13⅓ seconds (ISO/IEC 13818-1, 2.4.2.1). Different encoders will therefore operate at slightly different rates. These differences (different timestamps) are carried over when video/audio streams are generated by different encoders and, optionally, recorded for later playback (advertisements). The decoder must be able to synchronize its clock with the encoder clock used to encode the TS in order to present properly timed video and to "lip sync" the audio. Decoders usually have a phase-locked loop (PLL) that incorporates a drift adjustment used to match the encoder clock frequency. The decoder uses the incoming PCRs to synchronize the PLL to the encoder clock.

For video data, MPEG provides a high degree of compression by encoding blocks of pixels using various techniques and then using motion compensation to encode most video frames as predictions from or between other frames. In particular, the encoded MPEG video stream is comprised of a series of groups of pictures (GOPs), and each GOP begins with an independently encoded I-frame (intra-coded frame) and may include one or more following P-frames (predictive-coded frame) and B-frames (bi-directionally predictive-coded frame). Each I-frame can be decoded without additional information. Decoding of a P-frame requires information from a preceding frame in the GOP. Decoding of a B-frame requires information from a preceding and a following frame in the GOP. To minimize decoder buffer requirements, each B-frame is transmitted in reverse of its presentation order, so that all the information of the other frames required for decoding the B-frame will arrive at the decoder before the B-frame.

Splicing of audio/visual programs is a common operation performed, for example, whenever one encoded television program stream is switched to another or when an ad stream is inserted into the current program stream. Splicing of MPEG encoded audio/visual streams is considerably more difficult than splicing uncompressed audio and video, and a number of problems result, namely:

The P and B-frames cannot be decoded without a preceding I-frame, so that cutting into a stream after an I-frame renders the P and B-frames meaningless The P and B-frames are considerably smaller than the I-frames, so that the frame boundaries are not evenly spaced and must be dynamically synchronized between the two streams at the time of the splice by adjusting DTS, PTS, and PCR timestamps (the DTS-PCR (DTS minus PCR, i.e., time until decode) values may be different between the two streams)

If the PCR timestamps are not adjusted properly the PLL of the decoder may become unsynchronized or lose lock The video decoder buffer is required to compensate for the uneven spacing of the frame boundaries in the encoded streams so splicing may cause underflow or overflow of the video decoder buffer (when two segments of an MPEG compressed video stream, both of which are compliant with the MPEG decoder buffer model, are "glued" together, then in general the resulting MPEG stream may not comply with the VBV model)

e.g., the information in a program stream has an encode rate that is compliant with the VBV model, and advertisement "ad" is spliced in with a higher encode rate; the resulting stream can overflow the decoder buffer These problems, if unmitigated, can result in unwelcome video and audio effects for the customer. In order to solve these problems, traditional MPEG splicing solutions use transcoding or requantizing to modify the size of the video frames around the splice points in order to generate a valid video/audio stream. To do this, a splicer needs to dissect the frame information and modify it. This requires expensive hardware and/or software (transraters). What is needed is a simple software solution to splice two TSs together to form a decoder compliant TS.

DESCRIPTION OF EXAMPLE EMBODIMENTS

Overview

Techniques are provided herein for pre-identifying frames in a first data stream that may be removed based on a level of information contained in the respective frame, and for selecting a second data stream of known length to be spliced into the first data stream beginning at a predetermined time, wherein the first data stream comprises a slot of known length to accommodate the second data stream. The second data stream and parameters of the slot are analyzed to determine if the slot can accommodate the second data stream, and if the slot can not accommodate the second data stream, then one or more low information frames are added to the first data stream to introduce delay between the first stream and the second stream. The delay allows a decoder buffer to drain. Then one or more pre-identified frames in the first data stream are removed in order to compensate for the added delay such that the overall delay in the first data stream remains close to zero. Preferably, the pre-identified frames comprise redundant or near redundant frames.

In general, the first data stream may be characterized as a network or program feed and the second stream is a temporary feed such as an advertisement. The start of the splice is the outpoint, i.e., the point where the program stream is exited. The end of the splice is the inpoint where the program stream is re-entered.

The problems with splicing the advertisement, as mentioned above, can be categorized into three areas:
1. The encode rates between the two streams are different.
2. The DTS-PCR values between the two streams are different.
3. The DTS, PTS, and PCR timestamps are not updated at the outpoint and/or inpoint.

In order to solve the above problems expensive hardware and/or software solutions are employed to precondition or transcode/transrate one or both streams.

A major advantage of the present invention is that the network stream and/or the ad stream do not have to be pre-conditioned for splicing. In addition the method works for MPEG-2, MPEG-4 H.264/AVC/SVC, VC-1, and AVS codecs, to name a few. Thus, the techniques present herein allow for naive or unsophisticated ad insertion.

Figure 1:
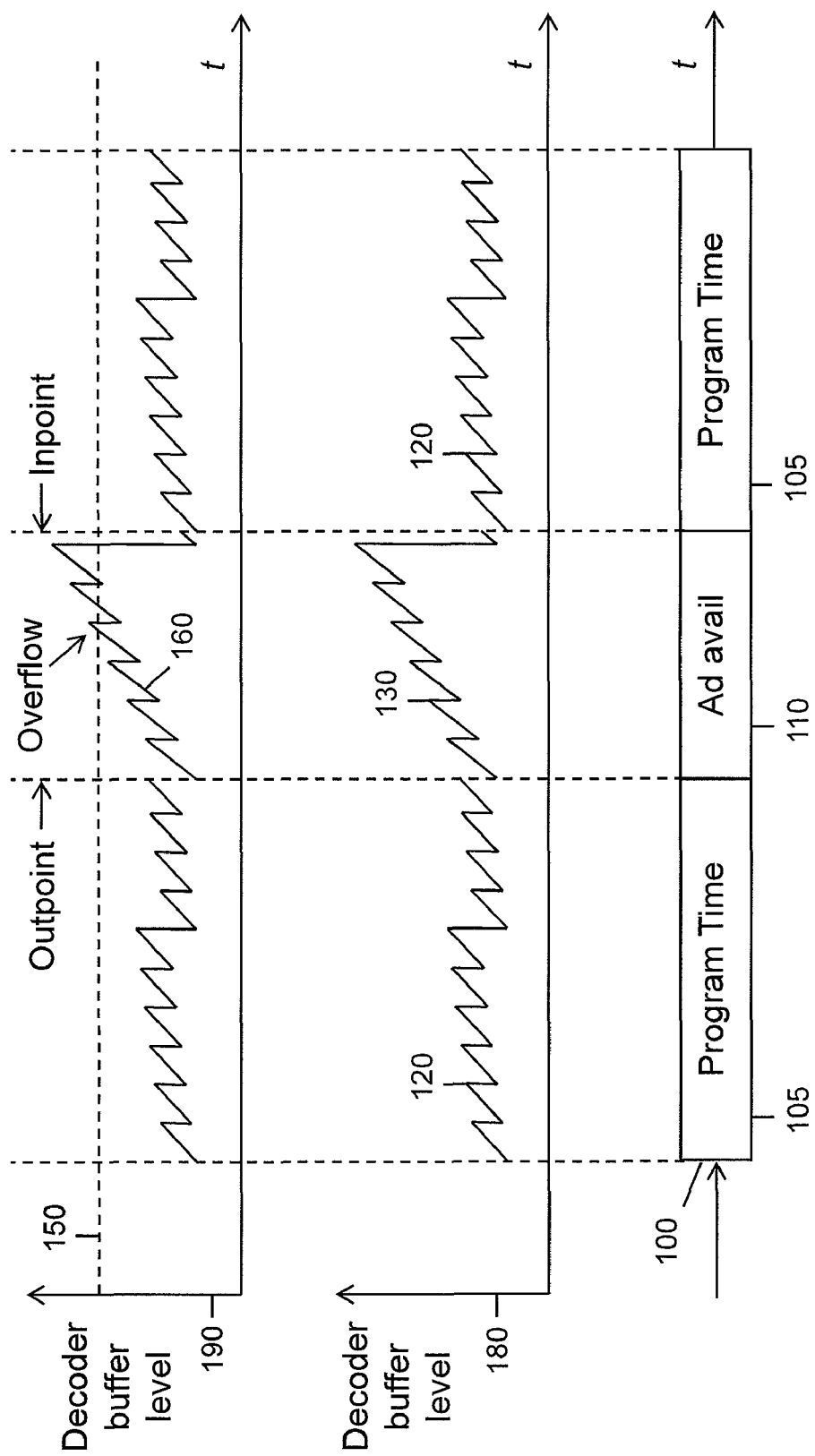
FIG. 1 is an example of a block diagram of an advertisement with a higher buffer level than the buffer level of a program transport stream causing a decoder buffer overflow.
Figure 2:
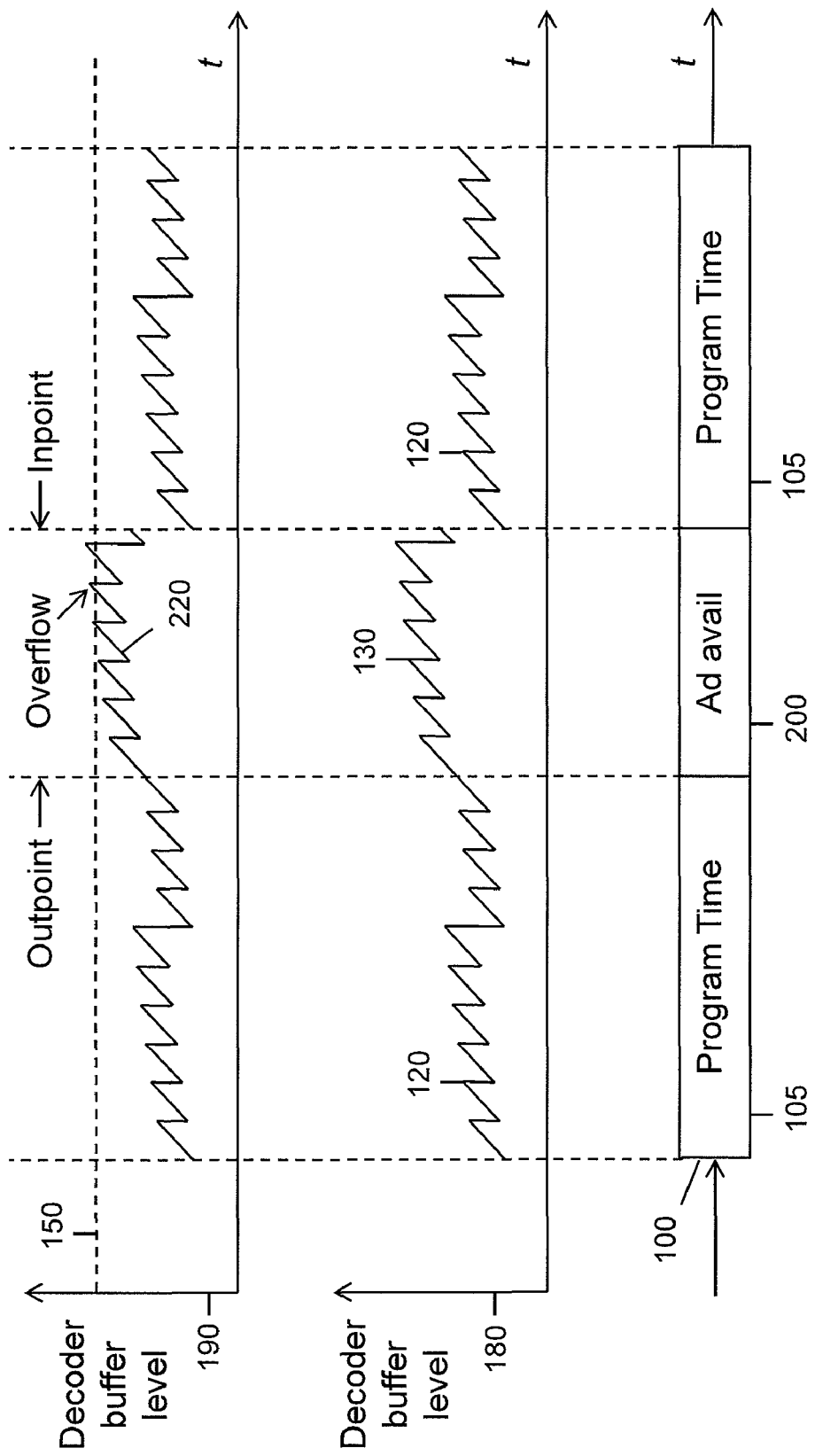
FIG. 2 is an example of a block diagram of an advertisement with DTS-PCR values different from the DTS-PCR values of a program transport stream which, in turn, causes a decoder buffer overflow.
Figure 3:
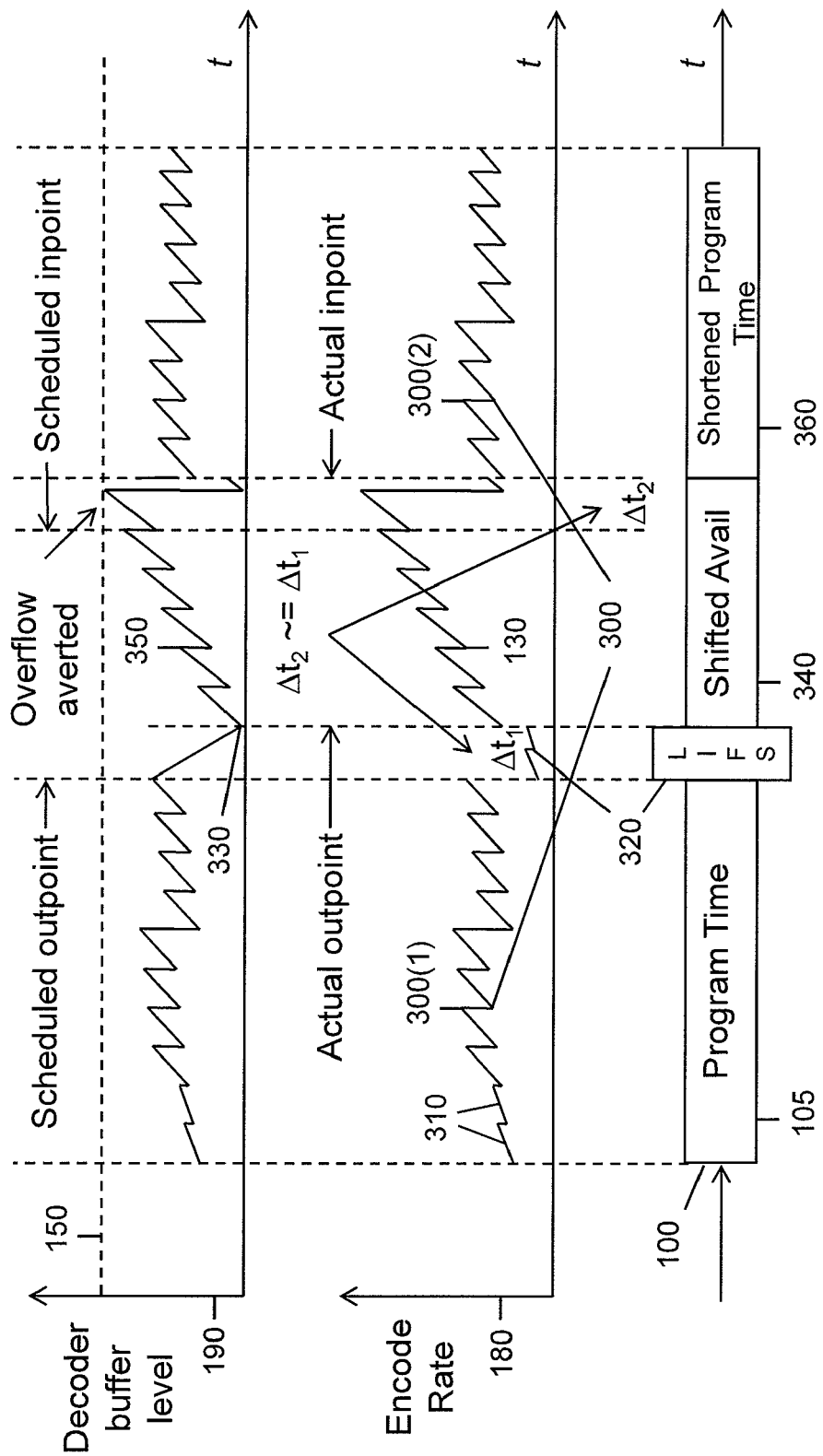
FIG. 3 is an example of a block diagram of an advertisement with a higher buffer level than the buffer level of a program transport stream (as in FIG. 1) in which a low-information frame insertion and pre-identified frame removal process has been applied in accordance with an embodiment of the present invention.

Before turning to the figures, note the timing and levels shown with respect to FIGS. 1-3 are not to scale. The noted outpoints and inpoints do not reflect ideal splice points with respect to the transport streams depicted. The diagrams are meant to simply illustrate the problems and solutions provided by embodiments of the present invention.

Referring first to FIG. 1, one problem with ad splicing is shown in which a decoder buffer overflows. A transport stream (TS) timing diagram 100 is shown which depicts time available for programming 105, and time available for advertising (ad avail/slot) 110 for which a second TS (ad) may be switched to or inserted. A decode buffer level diagram 180 is shown for a program TS 120 and for an ad TS 130. The buffer level for the program TS 120 and for the ad stream 130 form a sawtooth pattern indicating that data is filled (ramped up) then sent (an instantaneous vertical drop). The steepness of the sawtooth pattern indicates the data rate; the higher the slope (steeper the pattern), the higher the data rate. In the example buffer level diagram 180, the ad TS 130 has a higher data rate than the program TS 120.

Also shown in FIG. 1 is a decoder buffer level diagram 190 for a spliced TS combining the program TS 120 and the ad TS 130. The diagram 190 depicts a maximum buffer level 150. By design, the decoder buffer level mimics the encode rate and has a sawtooth pattern (data fills the decoder buffer and is then displayed). An encoder (shown in FIG. 4) internally models the decoder buffer level using the VBV model and controls the buffer level for the program TS 120. The encoder, in most cases, will not have any information about the buffer level for the ad TS 130 or other TS that may be switched to or inserted during the ad avail 110. With the ad TS 130 having higher buffer level than the program TS 120, the combined TS 160 causes an overflow in the decoder buffer as shown. Information fed into the decoder buffer during an overflow is lost. The lost information may cause unwanted problems for a customer viewing the program/ad such as macroblocking and garbled audio.

Next, referring to FIG. 2, a second problem with ad splicing is shown in which a decoder buffer overflows. As in FIG. 1, the transport stream (TS) timing diagram 100, the buffer level diagram 180, and the decoder buffer level diagram 190 are shown. In this example the DTS-PCR values for the ad TS 130 are different than the DTS-PCR values for the program TS 120. Thus the ad TS 130 would fill the decode buffer faster than the program TS 120. This is depicted as a higher decode buffer level relative to the program TS 120.

Since the decoder decodes at a constant rate, the buffer level can be thought of as time-to-go or delay from input to output (duration/delay is the number of bits (buffer level) divided by the constant decoder decode bitrate). And since the decoder buffer is already conditioned for the DTS-PCR values for the program TS 120, splicing the ad TS 130 increases the buffer level instantaneously for the decoder at the outpoint. As shown, this increased buffer level causes a decoder buffer overflow prior to the inpoint.

It is well known in the art that introducing delay into the program TS 120 will allow the decoder buffer levels to drop and thus reduce the possibility of decoder buffer overflow. Embodiments of the present invention eliminate the build up of delay previously introduced to allow the decoder buffer to drain. Turning now to FIG. 3, delay is removed by a pre-identified frame removal process 600, hereinafter "the process 600." The process 600 is discussed fully in conjunction with FIG. 6. As in FIG. 1, the transport stream (TS) timing diagram 100, the buffer level diagram 180, and the decoder buffer level diagram 190 are shown. Also, the higher buffer level ad TS 130 that caused the decoder buffer overflow in FIG. 1 is depicted.

At reference numeral 300 the buffer level of a program TS 300 is depicted in two parts 300(1) and 300(2). Unlike program TS 120, program TS 300(1) comprises pre-identified frames (PIFs) 310 to be removed from the program TS 300 if necessary to reduce delay. Prior to or just after the scheduled outpoint the ad TS 130 is analyzed and it is determined that a buffer overflow will occur if the ad TS 130 is introduced at the splice point. In this case the splicer (shown in FIGS. 4 and 5) introduces low-information frames (LIFs) 320 at the scheduled outpoint. The LIFs 320 introduce delay into the program TS 300 and is shown as $\Delta t_1$. This causes the ad avail 340 and actual outpoint, to be shifted forward in time by an amount equal to $\Delta t_1$. Because the LIFs 320 are encoded at a lower buffer level the decoder buffer can drain as shown at reference numeral 330. As a result of the drained decoder buffer level 330, the decoder buffer levels 350 associated with the ad TS 130 do not cause an overflow of the decoder buffer.

At this point, if left alone, the program TS 300 would reflect a build up of delay every time LIFs were inserted. To alleviate the build up of delay in the program stream PIFs like those depicted at reference numeral 310 can be removed by the splicer. The splicer would attempt to remove PIFs to reduce the delay by an amount equivalent to $\Delta t_1$ shown as $\Delta t_2$. However it will not always be possible to match $\Delta t_2$ to $\Delta t_1$. The splicer can sum the differences between the $\Delta t_2$'s and $\Delta t_1$'s, and adjust the amount of removed PIFs so that overall delay equals or approaches zero. As shown in FIG. 3, the program TS 300(2) has PIFs removed equivalent to $\Delta t_2$. This results in a shortened program time 360. Thus, the overall length of time of the combined program TS 300 and the ad TS 130 (represented by the TS timing diagram 100) remains relatively unchanged. Although not depicted, introducing LIFs into the program TS will also solve the problem illustrated by FIG. 2, where the DTS-PCR values for the ad TS 130 are different from the DTS-PCR values for the program TS 120, and is known to those skilled in the art.

Figure 4:
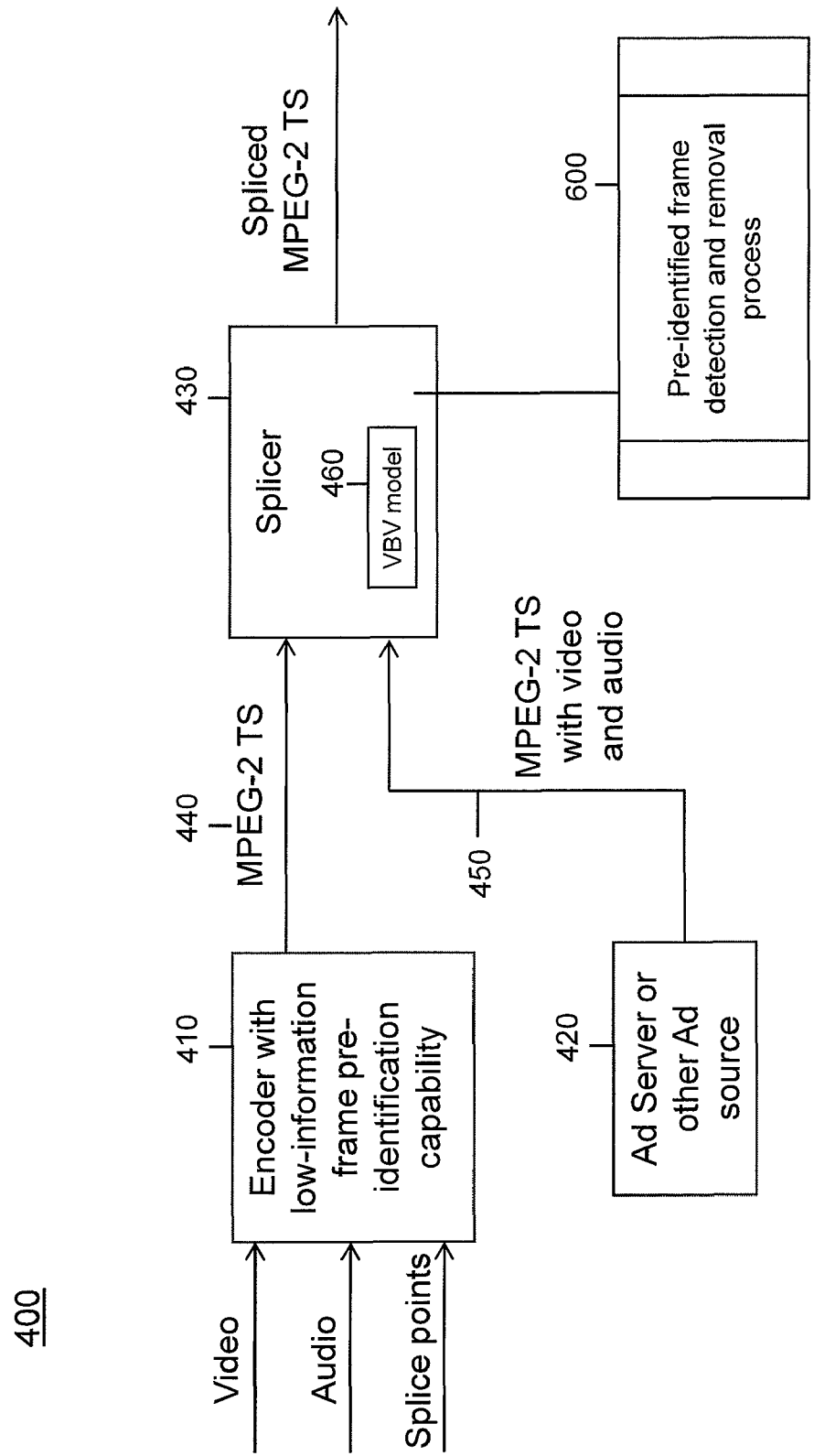
FIG. 4 is an example of a block diagram of a system which incorporates a pre-identified frame removal process in accordance with an embodiment of the present invention.

Next, FIG. 4 depicts a system generally at 400, which incorporates a pre-identified frame removal process 600 in accordance with an embodiment of the present invention. The system comprises an encoder 410, an ad server 420, and a splicer 430. All three components may be part of a headend facility (not shown) or located separately and connected by a network (not shown). Two transport streams are depicted; one for the program TS 440 and the other for the ad TS 450. The transport streams 440 and 450 are depicted as unidirectional, and this is not meant to be limiting or to imply there is not a reverse communications path. The encoder 410 receives video, audio, and splicing information. The encoder 410 combines and encodes the video, audio, and splicing information to form a program TS 440. The encoder 410 also has the capability to pre-identify low-information frames in real-time and to encode information about which frames may be removed by the splicer 430. In another embodiment the frames are pre-identified at ingest into the system in question, e.g., a content delivery system (CDS). It is also possible to pre-identify frames for removal in the ad TS 450.

In one embodiment the preidentification information may be stored in a database. The pre-identification information may be sent in a separate data stream or inserted as metadata in the transport stream. Alternatively, the pre-identification information may be stored as metadata within the transport streams at ingest.

The splicer 430 receives the program TS 440 and the ad TS 450. The splicer 430 uses a VBV model 460 for modeling the decoder buffer and monitors the DTS-PCR times of the program TS 440. The splicer 430 also monitors the program TS 440 for splice outpoints and inpoints. Once an outpoint is found, or if the ad TS 450 is available ahead of time, then the splicer monitors parameters of the ad TS 450, e.g., the DTS-PCR times for the ad and the length of the ad. The splicer 430, using the process 600, analyzes the available information and determines if the decoder buffer may overflow when the ad TS 450 is spliced into the program TS 440. The splicer 430 may also adjust the DTS/PCR/STC values to provide a seamless splice. If the DTS/PCR/STC values are not adjusted the splice may not be seamless, and video and/or audio anomalies may occur. For a splice requiring less processing the splicer 430 may set a discontinuity indicator in a transport packet adaptation field instead of adjusting the DTS/PCR/STC values.

Figure 5:
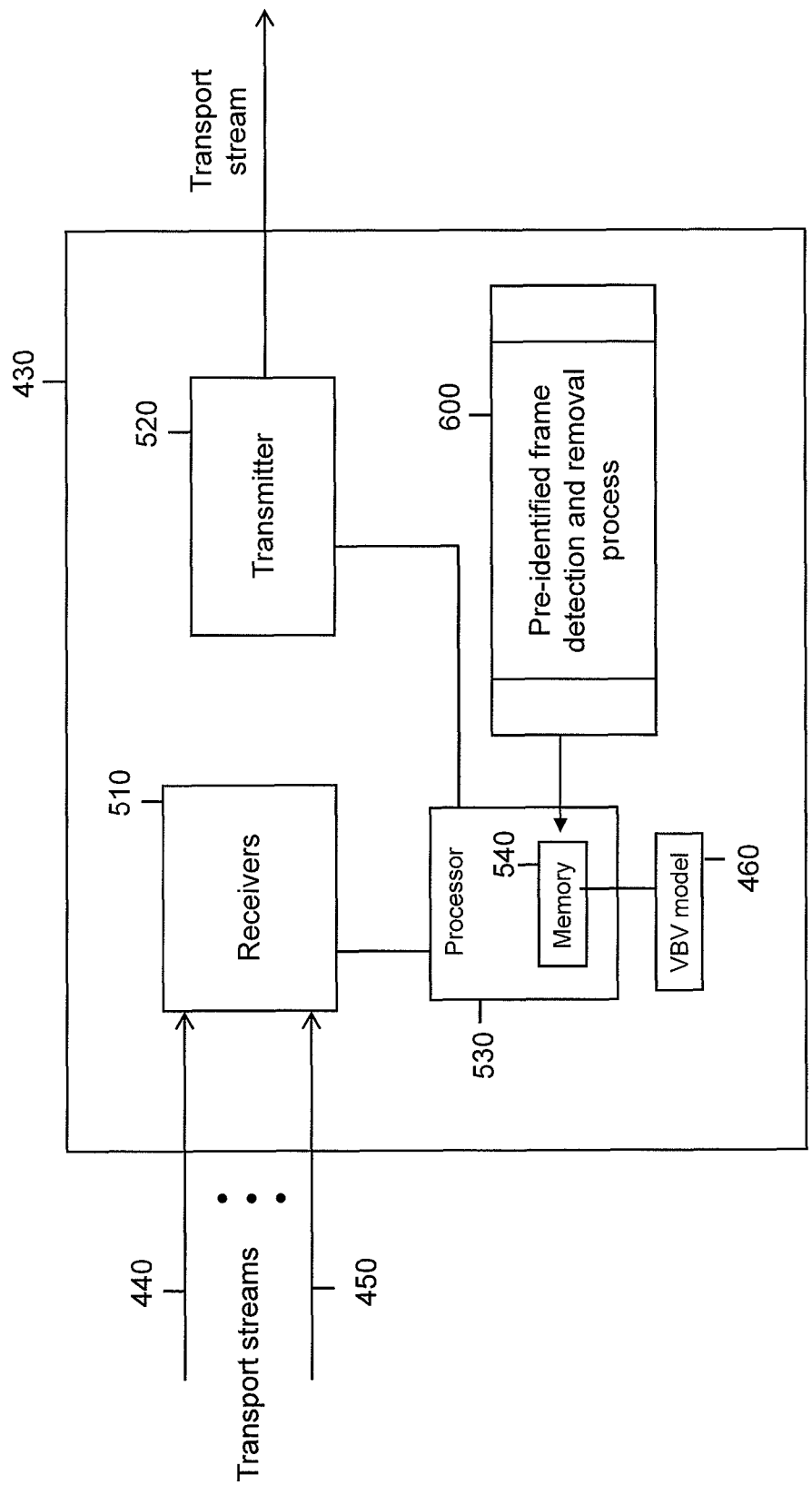
FIG. 5 is an example of a block diagram of a splicer that is configured to perform a pre-identified frame removal process in accordance with an embodiment of the present invention.

Turning to FIG. 5, an example of a block diagram of a splicer 430 configured to perform the pre-identified frame removal process 600 is shown. The splicer 430 comprises receivers 510, a transmitter 520, and a processor 530 with a memory 540 for storage of data and instructions. The receivers 510 may receive a number of transport streams including the program TS 440 and the ad TS 450. The transmitter 520 is configured to transmit a transport stream or streams, spliced or unsliced, that were received by the receivers 510. The processor 530 may be configured to perform a pre-identified frame removal process shown at 600, either by way of instructions stored in the memory 540 or by way of separate programmable logic or fixed logic. The memory 540 may be separate or part of the processor 530.

The process 600 may be implemented by logic encoded in one or more tangible media (e.g., embedded logic such as an application specific integrated circuit, digital signal processor instructions, software that is executed by a processor, etc.), wherein the memory 540 stores data used for the computations described herein (and/or to store software or processor instructions that are executed to carry out the computations described herein). To this end, logic is provided in any of these forms to execute the process 600. The process 600 is now described in more detail hereinafter in conjunction with FIG. 6.

Figure 6:
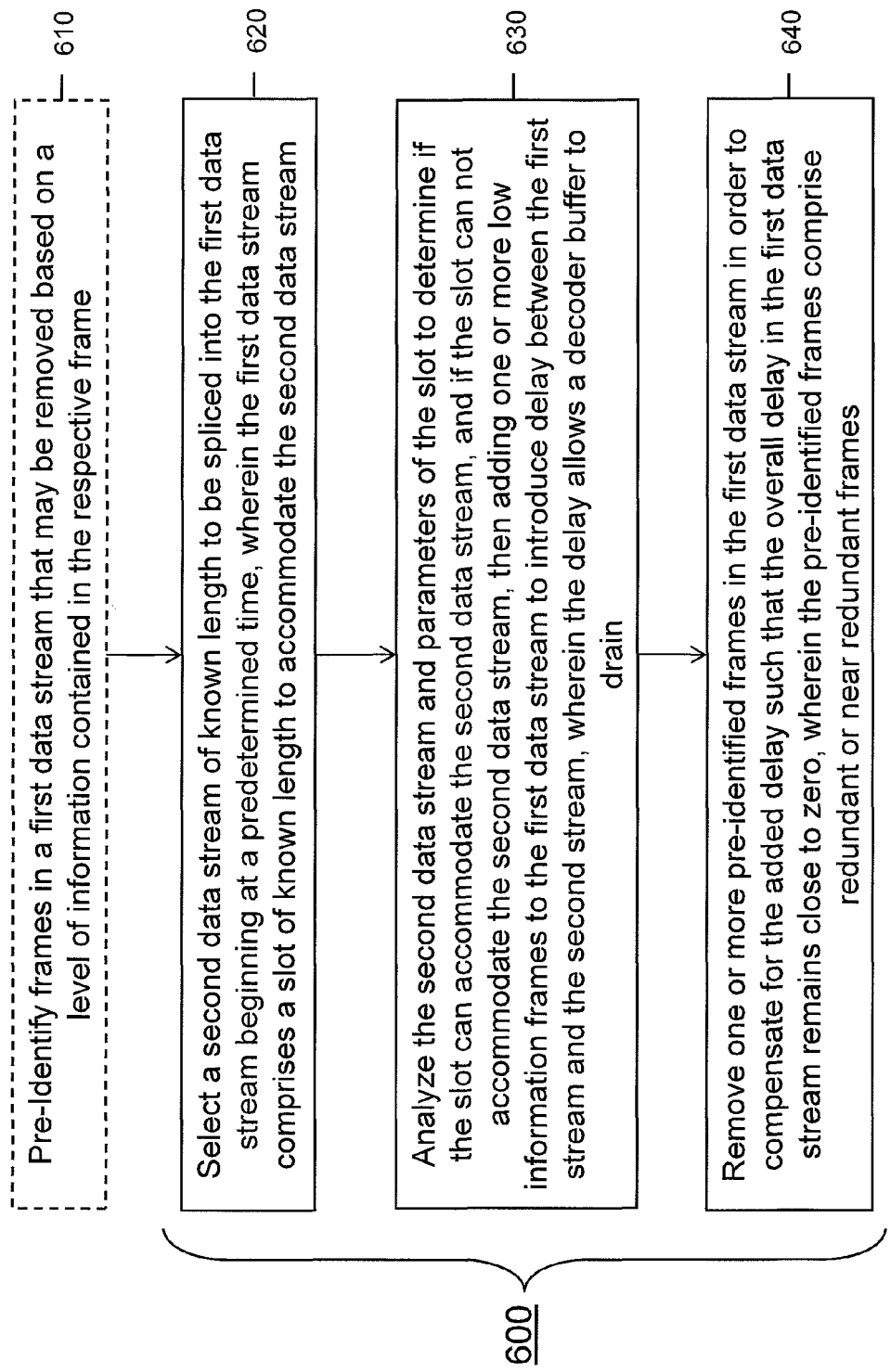
FIG. 6 depicts a flow chart generally depicting an example of the pre-identified frame removal process in accordance with an embodiment of the present invention.

Turning to FIG. 6, the pre-identified frame removal process 600 is now described. At 610 frames are pre-identified based on a level of information contained in the respective frame. FIG. 6 shows that the pre-identification performed at 610 may not actually be part of the process 600 because it may be performed in another device, or it may be part of the process 600 if the pre-identification 610 is performed on the same device. The pre-identified frames are redundant or near redundant, i.e., a redundant or low level of information, and are selected based on pre-determined criteria.

In one embodiment the criteria could be detection of small sequences of consecutive black frames. If a longer sequence of black frames is detected then part of the sequence may be preserved if the sequence occurs near the ad insertion point, or the sequence may be identified for partial or full removal.

In another embodiment, video frames that are not used for reference (e.g., not I-frames) and contain little or no motion may be pre-identified. This can be accomplished by inspecting the motion vectors of prior frames in the display order. As a practical matter, the pre-identified frames would be non-reference 'P' frames or non-reference 'B' frames in the case of an MPEG-2 transport stream.

Next at 620, a second data stream of known length to be spliced into the first data stream beginning at a predetermined time is selected. The first data stream comprises a slot of known length to accommodate the second data stream. In practice, the first data stream is a program transport stream like program TS 440, and the second data stream is akin to ad TS 450. Ideally, both stream are encoded at the same rate and are scheduled to decode with the same delay (DTS-PCR times are equal for both streams). As discussed earlier, however, this is rarely the case.

At 630, the second data stream and parameters of the slot are analyzed to determine if the slot can accommodate the second data stream. If the slot can not accommodate the second data stream, then one or more low information frames are added to the first data stream to introduce delay between the first stream and the second stream. The delay allows a decoder buffer to drain. The low information frames may contain null packets (PID 8191 in an MPEG-2 transport stream), black frames, or fade sequences.

Finally, at 640, one or more pre-identified frames in the first data stream are removed in order to compensate for the delay added at 630 such that the overall delay in the first data stream remains close to zero. As discussed at 610 the pre-identified frames comprise redundant near redundant frames. By balancing the addition and removal of delay, low-complexity ad insertion may be accomplished using software or less expensive hardware than is currently required by modern content delivery systems.

Although the apparatus, system, and method are illustrated and described herein as embodied in one or more specific examples, it is nevertheless not intended to be limited to the details shown, since various modifications and structural changes may be made therein without departing from the scope of the apparatus, system, and method and within the scope and range of equivalents of the claims. Accordingly, it is appropriate that the appended claims be construed broadly and in a manner consistent with the scope of the apparatus, system, and method, as set forth in the following claims.

What is claimed is:

1. A method comprising:
receiving, at a video splicer, a first data stream;
receiving, at the video splicer, a second data stream of known length to be spliced into the first data stream beginning at a predetermined time, wherein the first data stream comprises a slot of known length to accommodate the second data stream;
analyzing the second data stream and parameters of the slot to determine if the slot can accommodate the second data stream, and when the slot can not accommodate the second data stream adding one or more low information frames to the first data stream to allow a decoder buffer to drain information related to the first data stream; and
removing one or more pre-identified frames from the first data stream to remove a delay $\Delta T_2$ in the first data stream to compensate for a delay $\Delta T_1$ resulting from adding one or more low information frames such that a sum of $\Delta T_1$ and $\Delta T_2$ equals or approaches zero, wherein the pre-identified frames comprise redundant or near redundant frames.

2. The method of claim 1, further comprising pre-identifying frames in the second data stream that may be removed based on a level of information contained in the respective frames of the second data stream.

3. The method of claim 1, wherein the first data stream and the second data stream comprise one of MPEG-2, MPEG-4, VC-1, and AVS transport streams.

4. The method of claim 3, wherein analyzing further comprises analyzing a video buffer verifier model associated with the first data stream and the second data stream.

5. The method of claim 3, wherein the one or more pre-identified frames comprise one of a consecutive black frames and non-reference frames with little or no motion.

6. The method of claim 3, wherein the one or more low information frames each comprise one of null packets, black frames, and fade sequence frames.

7. The method of claim 3, wherein the second data stream is seamlessly spliced into the first data stream by adjusting presentation time stamps, decode time stamps, and program clock references associated with the second data stream.

8. The method of claim 3, wherein the second data stream is non-seamlessly spliced into the first data stream by setting a discontinuity indicator in a transport packet adaptation field.

9. The method of claim 2, further comprising removing one or more pre-identified frames in the second data stream in order to compensate for the added delay such that the overall delay in the first data stream remains close to zero, wherein the pre-identified frames comprise nearly redundant frames.

10. An apparatus comprising:
two or more receivers, wherein each receiver is configured to receive a data stream;
one or more transmitters, wherein each transmitter is configured to transmit a data stream;
a memory for buffering received data streams, buffering data streams to be transmitted, and storing data and instructions for a processor; and
a processor configured to:
detect pre-identified frames in a first data stream that may be removed based on a level of information contained in the respective frame;
select a second data stream of known length to be spliced into the first data stream beginning at a predetermined time, wherein the first data stream comprises a slot of known length to accommodate the second data stream;
analyze the second data stream and parameters of the slot to determine if the slot can accommodate the second data stream, and if the slot can not accommodate the second data stream, then adding one or more low information frames to the first data stream allow a decoder buffer to drain; and
remove one or more pre-identified frames to remove a delay $\Delta T_2$ in the first data stream to compensate for a delay $\Delta T_1$ resulting from adding one or more low information frames such that a sum of $\Delta T_1$ and $\Delta T_2$ equals or approaches zero, wherein the pre-identified frames comprise redundant or near redundant frames.

11. The apparatus of claim 10, wherein the processor is further configured to detect pre-identified frames in the second data stream that may be removed based on a level of information contained in the respective frame of the second data stream.

12. The apparatus of claim 11, wherein the first data stream and the second data stream comprise one of MPEG-2, MPEG-4, VC-1, and AVS transport streams.

13. The apparatus of claim 12, wherein the processor is further configured to analyze a video buffer verifier model associated with the first data stream and the second data stream.

14. The apparatus of claim 12, wherein the one or more pre-identified frames comprise one of consecutive black frames and non-reference frames with little or no motion.

15. The apparatus of claim 12, wherein the one or more low information frames each comprise one of null packets, black frames, and fade sequence frames.

16. The apparatus of claim 12, wherein the processor is further configured to splice the second data stream seamlessly into the first data stream by adjusting presentation time stamps, decode time stamps, and program clock references associated with the second data stream.

17. The apparatus of claim 12, wherein the processor is further configured to splice the second data stream non-seamlessly into the first data stream by setting a discontinuity indicator in a transport packet adaptation field.

18. The apparatus of claim 11, wherein the processor is further configured to remove one or more pre-identified frames to remove delay in the second data stream.

* * * * *